(12) United States Patent
Takenouchi et al.

(10) Patent No.: US 7,549,710 B2
(45) Date of Patent: Jun. 23, 2009

(54) VEHICLE-USE BRAKE DEVICE

(75) Inventors: Kazuya Takenouchi, Saitama (JP);
Yutaka Nishikawa, Saitama (JP);
Masaie Kato, Saitama (JP); Kazuhiko Tani, Saitama (JP); Shinji Takayanagi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 11/808,477

(22) Filed: Jun. 11, 2007

(65) Prior Publication Data

US 2008/0001474 A1    Jan. 3, 2008

(30) Foreign Application Priority Data

Jun. 27, 2006    (JP) .............................. 2006-176297

(51) Int. Cl.
*B60T 13/00*    (2006.01)

(52) U.S. Cl. ..................................... 303/9.64; 188/344

(58) Field of Classification Search ............. 188/151 R, 188/152, 344; 303/9.62–9.65
See application file for complete search history.

(56) References Cited

U.S. PATENT DOCUMENTS

| | | | |
|---|---|---|---|
| 5,312,172 | A | 5/1994 | Takeuchi |
| 6,793,295 | B2 * | 9/2004 | Sakamoto .................. 303/9.64 |
| 7,234,784 | B2 * | 6/2007 | Tani et al. .................. 303/9.64 |
| 7,338,136 | B2 * | 3/2008 | Nakayama et al. ............. 303/3 |
| 2006/0131951 | A1 * | 6/2006 | Nakayama et al. ......... 303/9.64 |

FOREIGN PATENT DOCUMENTS

| | | |
|---|---|---|
| DE | 43 27 206 A1 | 2/1995 |
| DE | 44 13 579 A1 | 10/1995 |
| DE | 195 43 583 C1 | 2/1997 |
| EP | 1 671 865 A1 | 6/2006 |
| JP | 2005-212677 A | 8/2005 |

* cited by examiner

*Primary Examiner*—Christopher P Schwartz
(74) *Attorney, Agent, or Firm*—Birch, Stewart, Kolasch & Birch, LLP

(57) ABSTRACT

To provide a vehicle-use brake device capable of performing a by-wire-method control of high accuracy in response to an inner pressure in a passage by using a pressure sensor possessing high resolution while causing no trouble in view of pressure proof performance. A master cylinder and a brake caliper are connected with each other by a main brake passage and a normally-open solenoid open/close valve V1 is provided to the passage. A reaction simulator is connected to the passage closer to the master cylinder side than the open/close valve V1 by way of a branch passage. A hydraulic modulator is connected to the passage closer to the brake caliper side than the open/close valve V1 by way of a supply/discharge passage. A normally-closed solenoid open/close valve V2 is provided to the branch passage, while a normally-closed solenoid open/close valve V3 is provided to the supply/discharge passage.

18 Claims, 5 Drawing Sheets

VEHICLE-USE BRAKE DEVICE

CROSS-REFERENCE TO RELATED APPLICATIONS

The present application claims priority under 35 USC 119 to Japanese Patent Application No. 2006-176297 filed on Jun. 27, 2006 the entire contents of which are hereby incorporated by reference.

BACKGROUND OF THE INVENTION

1. Field of the Invention

The present invention relates to a vehicle-use brake device which is used for a vehicle such as a motorcycle.

2. Description of Background Art

A brake device for a motorcycle has been developed that is referred to as a by-wire-method which electrically detects a manipulated variable of a brake manipulation portion such as a brake lever or a brake pedal by a sensor, generates a liquid pressure by a hydraulic modulator which is electrically driven based on a detection value, and applies the liquid pressure to a brake caliper. This method is hereinafter, referred to as "by-wire method." See, for example, JP-A-2005-212677.

In such a brake device, a master cylinder, which is interlockingly operated with the brake manipulation portion, and a brake caliper are connected with each other by a main brake passage. A first solenoid open/close valve, which changes over the communication and the interruption between the master cylinder and the brake caliper, is interposed in the main brake passage. A hydraulic modulator is connected to the main brake passage by way of a supply/discharge passage at a position closer to the brake caliper than the first solenoid open/close valve. Further, a reaction simulator, which applies a pseudo reaction to the brake manipulation portion when the first solenoid open/close valve is closed, is connected to the main brake passage by way of a branch passage at a position closer to the master cylinder than the first solenoid open/close valve. Further, in the respective vicinities of the master cylinder and the brake caliper, an input-side pressure sensor and an output-side pressure sensor are respectively disposed. The above-mentioned respective solenoid open/close valve and hydraulic modulator are controlled based on detection values of these sensors.

Further, in the brake device, the main brake passage is used as a backup passage when a system failure occurs. Thus, the respective first to third solenoid open/close valves are configured such that the main brake passage is opened in a non-electricity-supply state thus interrupting the branch passage and the supply/discharge passage. More specifically, a normally-open solenoid open/close valve is adopted as the first solenoid open/close valve which is interposed in the main brake passage, and a normally-closed solenoid open/close valve is adopted as the second and third solenoid open/close valves which are interposed in the branch passage and the supply/discharge passage.

In such a brake device which adopts the by-wire method, the brake device is required to cope with quick brake inputting from a rider. However, to always maintain the respective solenoid open/close valves in a standby state by supplying electricity to these solenoid open/close valves leads to an increase in power consumption. Thus, such a situation is not preferable with respect to the vehicle which is required to miniaturize a capacity of a generator or a battery.

Accordingly, in the above-mentioned brake device, the respective solenoid open/close valves are brought into a non-electricity-supply state during a period in which the brake manipulation portion is not manipulated and electricity is supplied to the respective solenoid open/close valves when the elevation of an inner pressure in a passage due to brake inputting is detected by an input-side pressure sensor.

In general, in a vehicle-use brake device, there may be a case in which a large liquid pressure equal to or more than a normally-used pressure acts on the whole brake system due to a phenomenon other than a brake manipulation purpose. Accordingly, respective portions in the brake system are required to possess the pressure proof performance capable of withstanding such a high pressure. At the same time, respective pressure sensors on an input side and an output side which detect the inner pressure in the passage are also required to possess the similar pressure proof performances.

However, the liquid pressure sensor which is generally used at present adopts the structure which converts a pressure change into a strain quantity and outputs an electric signal corresponding to the strain quantity. When the sensitivity of the liquid pressure sensor is set such that the liquid pressure sensor can perceive a fine pressure change immediately after starting the braking, the pressure proof performance against the high pressure is lowered. To the contrary, when the sensitivity of the pressure proof performance is set high against the high pressure, the resolution with respect to the fine pressure change immediately after starting braking is lowered.

SUMMARY AND OBJECTS OF THE INVENTION

Accordingly, it is an object of an embodiment of the present invention to provide a vehicle-use brake device which is capable of performing a by-wire-method control of high accuracy in response to an inner pressure in a passage by adopting a pressure sensor possessing high resolution while ensuring a sufficient pressure proof performance.

As means for achieving the above-mentioned object, an embodiment of the present invention is directed to a vehicle-use brake device which includes a master cylinder 3 which is interlockingly operable with a brake manipulation portion 2. Wheel braking means, for example, a brake caliper 4 in the embodiment described later, imparts a braking force to a wheel based on a hydraulic manipulation. A main brake passage 5 connects the master cylinder and the wheel braking means. A normally-open first solenoid open/close valve V1 is provided to the main brake passage and manipulates the communication between the master cylinder and the wheel braking means and the interruption of the communication. A reaction simulator 9 applies a pseudo hydraulic reaction corresponding to a manipulated variable of the brake manipulation portion to the master cylinder. A branch passage 8 is branched from a portion of the main brake passage at a position closer to the master cylinder than the first solenoid open/close valve and connects the main brake passage and the reaction simulator. A normally-closed second solenoid open/close valve V2 is interposed in the branch passage and manipulates the communication between the master cylinder and the reaction simulator and the interruption of the communication. A hydraulic modulator 6 generates a liquid pressure by an electrically-operated actuator, for example, an electrically-operated motor 23 in the embodiment described later. A supply/discharge passage 7 is merged to a portion of the main brake passage at a position closer to a wheel braking means than the first solenoid open/close valve and connects the hydraulic modulator and the wheel braking means. A normally-closed third solenoid open/close valve V3 is interposed in the supply/discharge passage and manipulates the communication between the hydraulic modulator and the wheel braking means and the interruption of the communication. An input-side pressure sensor 28 detects an inner pressure of a passage on a side of the master cylinder. An output-side pressure sensor 29 detects an inner pressure of a passage on a side of the wheel braking means. Control means, for example, a controller 20 in the embodiment described later, controls the hydraulic modulator and the first to third solenoid open/close valves in response to an operational state of a vehicle and a brake manipulation. The input-side pressure sensor is arranged on the branch passage on a side of the reaction simulator while sandwiching the second solenoid open/close valve between the master cylinder and the input-side pressure sensor, and the output-side pressure sensor is arranged on the supply/discharge passage on a side of the hydraulic modulator while sandwiching the third solenoid open/close valve between the wheel braking means and the output-side pressure sensor.

Due to such a constitution, in a state that electricity is not supplied to the first to third solenoid open/close valves, the master cylinder and the wheel braking means are communicated with each other through the main brake passage, and the communication between the main brake passage and the reaction simulator and the communication between the hydraulic modulator and the main brake passage are held in an interrupted state respectively by the second and third solenoid open/close valves. The input-side pressure sensor is arranged on the reaction simulator side while sandwiching the second solenoid open/close valve between the master cylinder and the input-side pressure sensor, while the output-side pressure sensor is arranged on the hydraulic modulator side while sandwiching the third solenoid open/close valve between the wheel braking means and the output-side pressure sensor. Accordingly, even when an excessive liquid pressure is applied to the main brake passage in such a state, the pressure is not applied to the respective pressure sensors.

According to an embodiment of the present invention, the vehicle-use brake device includes traveling condition detection means, for example, a wheel speed sensor 31 in the embodiment described later, for detecting a traveling condition of the vehicle, and the control means performs a control to bring the second solenoid open/close valve into an open state in response to the detection of the traveling of the vehicle by the traveling state detection means.

Due to such a construction, when the vehicle is traveling, the second solenoid open/close valve opens the branch passage to make the master cylinder and the reaction simulator communicated with each other and, at the same time, the liquid pressure on the master cylinder side can be detected by the input-side pressure sensor. Accordingly, when the brake manipulation portion is manipulated from such a state, the liquid pressure on the master cylinder side can be detected by the input-side pressure sensor.

According to an embodiment of the present invention, when the input-side pressure sensor detects a pressure equal to or more than a manipulation determination threshold value, for example, a manipulation determination threshold value P1 in the embodiment described later, for determining the presence or non-presence of the brake manipulation after the second solenoid open/close valve is controlled to assume an open state, the control means performs a control to bring the first solenoid open/close valve into a closed state and performs a control to bring the third solenoid open/close valve into an open state.

Due to such a construction, when the brake manipulation portion is manipulated during traveling of the vehicle so that the pressure of the branch passage becomes equal to or more than the manipulation determination threshold value, the pressure change is detected by the input-side pressure sensor. As a result, the first solenoid open/close valve closes the main brake passage and, at the same time, the third solenoid open/close valve opens the supply/discharge passage. Thus, the liquid pressure corresponding to the brake manipulation is supplied to the vehicle braking means from the hydraulic modulator.

According to an embodiment of the present invention, when the input-side pressure sensor detects a pressure equal to or more than a pressure-proof threshold value, for example, a pressure-proof threshold value Ph1 in the embodiment described later, of the input-side pressure sensor after the second solenoid open/close valve is controlled to assumes an open state, the control means performs a control to bring the second solenoid open/close valve into a closed state.

Due to such a construction, when the pressure in the branch passage becomes equal to or more than the pressure-proof threshold value of the input-side pressure sensor during traveling of the vehicle, the second solenoid open/close valve closes the branch passage and the pressure equal to or more than the pressure-proof threshold value is not applied to the input-side pressure sensor.

According to an embodiment of the present invention, when the output-side pressure sensor detects a pressure equal to or more than a pressure-proof threshold value, for example, a pressure-proof threshold value Ph2 in the embodiment described later, of the output-side pressure sensor after the third solenoid open/close valve is controlled to assumes an open state, the control means performs a control to bring the third solenoid open/close valve into a closed state.

Due to such a constitution, when the pressure of the supply/discharge passage becomes equal to or more than the pressure-proof threshold value of the output-side pressure sensor during traveling of the vehicle, the third solenoid open/close valve closes the supply/discharge passage. Thus, the pressure equal to or more than the pressure-proof threshold value is not applied to the out-side pressure sensor.

According to an embodiment of the present invention, the input-side pressure sensor is arranged on the reaction simulator side while sandwiching the second solenoid open/close valve between the master cylinder and the input-side pressure sensor, and the output-side pressure sensor is arranged on the hydraulic modulator side while sandwiching the third solenoid open/close valve between the wheel braking means and the output-side pressure sensor. Accordingly, when electricity is not supplied to the first to third solenoid open/close valves, the respective pressure sensors on the input side and the output side are interrupted with respect to the main brake passage. Thus, even when an excessive liquid pressure is applied to the main brake passage, it is possible to protect the respective pressure sensors from the liquid pressure.

According to an embodiment of the present invention, when the vehicle starts traveling, the second solenoid open/close valve opens the branch passage so as to enable the input-side pressure sensor to detect the pressure on the master cylinder side. Thus, during the traveling of the vehicle, the manipulation of the brake manipulation portion can be speedily detected by the input-side pressure sensor.

According to an embodiment of the present invention, when the brake manipulation portion is manipulated during traveling of the vehicle and the pressure corresponding to the manipulation is detected by the input-side pressure sensor, the main brake passage is closed and the hydraulic modulator is allowed to be communicated with the wheel braking means thus changing over a control to the by-wire method brake control promptly.

According to an embodiment of the present invention, when the pressure in the branch passage becomes equal to or more than the pressure-proof threshold value of the input-side pressure sensor during traveling of the vehicle, the second solenoid open/close valve closes the branch passage. Thus, even when the excessive liquid pressure equal to or more than the pressure-proof threshold value of the input-side pressure sensor is applied to the master cylinder side, it is possible to protect the input-side pressure sensor from such a liquid pressure. In this manner, according to the present invention, it is possible to use the input-side pressure sensor having the high resolution without bringing about drawbacks with respect to the pressure proof. Thus, the accuracy of the control can be enhanced.

According to an embodiment of the present invention, when the pressure of the supply/discharge passage becomes equal to or more than the pressure-proof threshold value of the output-side pressure sensor during traveling of the vehicle, the third solenoid open/close valve closes the supply/discharge passage. Thus, even when the excessive liquid pressure equal to or more than the pressure-proof threshold value of the output-side pressure sensor is applied to the wheel braking means side, it is possible to protect the output-side pressure sensor from such a liquid pressure. In this manner, according to the present invention, it is possible to use the output-side pressure sensor having the high resolution without bringing about drawbacks with respect to the pressure proof. Thus, the accuracy of the control can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
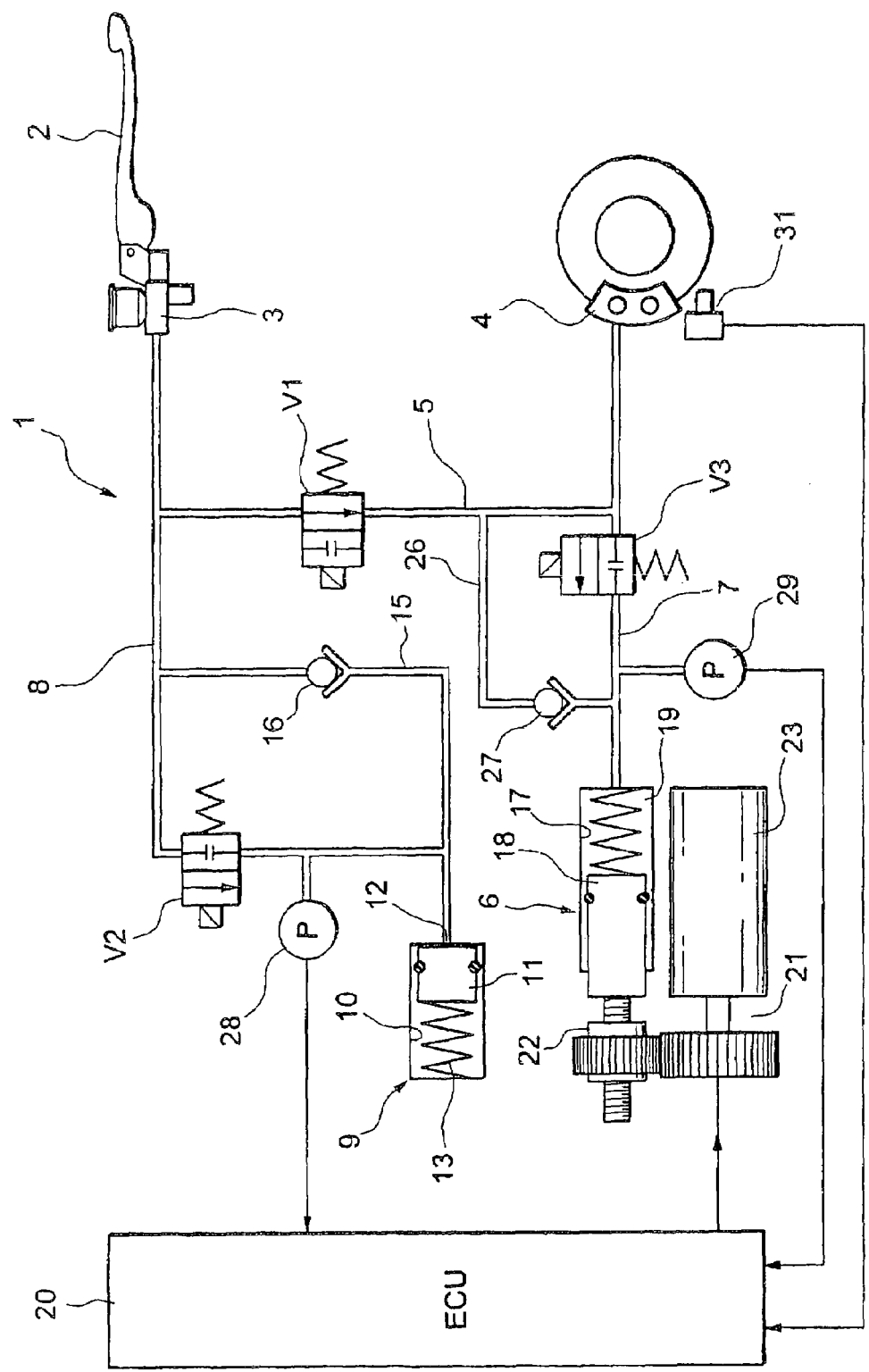
FIG. 1 illustrates a hydraulic circuit diagram of a brake device of a motorcycle showing one embodiment of the present invention in a system non-operative state.

Next, one embodiment of the present invention is explained in conjunction with the drawings.

In this embodiment, a vehicle-use brake device (hereinafter, referred to as "brake device") according to the present invention is applied to a brake of a motorcycle. In the respective drawings, only a hydraulic circuit 1 of the brake device on a front wheel side is shown. In practice, the brake device includes a braking circuit for a rear wheel side similar to the hydraulic circuit 1 for a front wheel side, and operations of hydraulic circuits for the front wheel side and the rear wheel side are properly interlocked by a control using a controller 20 (control means). More specifically, the brake device adopts a combined brake system (CBS: COMBINED BRAKE SYSTEM, hereinafter, referred to as "CBS") so as to apply a combined or interlocked braking force to the front and rear wheels corresponding to a driving condition and a brake manipulation of the vehicle. The hydraulic circuit 1 for the front wheel side and the hydraulic circuit for the rear wheel side differ from each other with respect to the construction of the brake manipulation portion 2. More specifically, the brake manipulation portion 2 is operated by a lever in the hydraulic circuit 1 for the front wheel, while the brake manipulation portion 2 is operated by a pedal in the hydraulic circuit for the rear wheel. However, these circuits have substantially the same construction. Thus, only the hydraulic circuit 1 for the front wheel side is explained in detail hereinafter.

The brake device adopts the by-wire method for both of the front wheel and the rear wheel. As a basic braking operation of the brake system during traveling of the vehicle, a manipulated variable of the brake manipulation portion 2 is electrically detected and a braking pressure is applied to a brake caliper 4 (wheel braking means) using a liquid pressure generated by a hydraulic modulator 6 based on the detection value. In the CBS control adopting the by-wire method, out of the hydraulic circuits on the front wheel side and the rear wheel side, the hydraulic circuit on the side at which the brake manipulation is performed earlier constitutes a master hydraulic circuit, and the liquid pressure is supplied to the brake caliper 4 of the circuit based on the manipulated variable of the brake manipulation portion 2 of the main hydraulic circuit. At the same time, the liquid pressure is also supplied to the brake caliper 4 of the hydraulic circuit which constitutes a slave hydraulic circuit in the same manner.

Further, this brake device adopts a brake system which properly controls a slip ratio of the wheel attributed to the brake manipulation at the time of performing braking (ABS: ANTI LOCK BRAKE SYSTEM, hereinafter referred to as "ABS").

The hydraulic circuit 1 includes a master cylinder 3 which supplies a working liquid to the passage corresponding to the manipulation of the brake manipulation portion 2 and the brake caliper 4 which imparts a braking force to the wheel using the liquid pressure. The master cylinder 3 and the brake caliper 4 are connected with each other by a main brake passage 5. A normally-open first solenoid open/close valve V1, which opens or closes the main brake passage 5, is provided to the main brake passage 5.

A branch passage 8 is provided to the main brake passage 5 at a position closer to the master cylinder 3 than the first solenoid open/close valve V1, and a reaction simulator 9 which applies a pseudo hydraulic reaction corresponding to the manipulated variable of the brake manipulation portion 2 to the master cylinder 3 is connected to the branch passage 8. Further, a normally-closed second solenoid open/close valve V2 is interposed in the branch passage 8, and the communication between the master cylinder 3 and the reaction simulator 9 and the interruption of the communication can be manipulated by the second solenoid open/close valve V2.

Further, a supply/discharge passage 7 is connected and merged to the main brake passage 5 at a position closer to the brake caliper 4 than the first solenoid open/close valve V1, and the hydraulic modulator 6 which generates a liquid pressure using power of an electrically operated motor 23 is connected to the supply/discharge passage 7. Further, a normally-closed third solenoid open/close valve V3 is interposed in the supply/discharge passage 7, and the communication between the hydraulic modulator 6 and the brake caliper 4 and the interruption of the communication can be manipulated by the third solenoid open/close valve V3.

The reaction simulator 9 is configured such that a piston 11 is reciprocally housed in the inside of a cylinder 10, a liquid chamber 12 which receives and stores the working liquid flown from the master cylinder 3 side is formed between the cylinder 10 and the piston 11, and a reaction spring 13 is provide to a backside of the piston 11. As the reaction spring 13, for example, a coil spring and an irregular-shaped resin resilient body or the like which differ in properties from each other are arranged in series. Thus, the reaction spring 13 can acquire properties that in response to the manipulation input of the piston 11 (brake manipulation portion 2), the reaction is firstly gradually increased and is sharply elevated in the vicinity of a stroke end.

Further, a bypass passage 15 which detours around the second solenoid open/close valve V2 is provided to the branch passage 8. A check value 16 which allows the working liquid to flow in the direction toward the master cylinder 3 from the reaction simulator 9 side is provided to the bypass passage 15.

On the other hand, the hydraulic modulator 6 is configured such that the piston 18 is slidably disposed in the inside of the cylinder 17, and a liquid pressure chamber 19 which is defined between the cylinder 17 and the piston 18 is connected with the supply/discharge passage 7. The piston 18 is reciprocally manipulated by an electrically-operated drive mechanism 21. The electrically-operated drive mechanism 21 is configured such that an output shaft of an electrically-operated motor 23 (electrically-operated actuator) is interlocked with the piston 18 by way of a ball screw mechanism 22, and the electrically-operated motor 23 is rotatably controlled by a controller 20. The hydraulic modulator 6 manipulates the reciprocation position of the piston 18 due to a control of the electrically-operated motor 23 by the controller 20. Due to such a manipulation, the supply and discharge of the working liquid to and from the liquid pressure chamber 19 are controlled.

Further, a bypass passage 26 is provided to the supply/discharge passage 7 while detouring around a third solenoid open/close valve V3, and a check valve 27 which allows the flow of the working liquid in the direction toward the brake caliper 4 from the hydraulic modulator 6 side is provided to the bypass passage 26.

To the branch passage 8 which connects the master cylinder 3 and the reaction simulator 9, an input-side pressure sensor 28 is provided on the reaction simulator 9 side while sandwiching the second solenoid open/close valve V2 between the master cylinder 3 and the input-side pressure sensor 28. The input-side pressure sensor 28 detects an inner pressure in a passage on the master cylinder 3 side in a state that the second solenoid open/close valve V2 opens the branch passage 8 and outputs a detection signal to the controller 20.

In the same manner, to the supply/discharge passage 7 which connects the hydraulic modulator 6 and the brake caliper 4, an output-side pressure sensor 29 is provided on the hydraulic modulator 6 side while sandwiching the third solenoid open/close valve V3 between the output-side pressure sensor 29 and the brake caliper 4. The output-side pressure sensor 29 detects an inner pressure in a passage on the brake caliper 4 side in a state that the third solenoid open/close valve V3 opens the supply/discharge passage and outputs a detection signal to the controller 20.

Further, wheel speed sensors 31 (traveling state detection means) which detect respective rotational speeds of the front and the rear wheels are provided in the vicinity of the front wheel and the rear wheel respectively, and detection signals of the respective wheel speed sensors 31 are inputted to the controller 20.

The controller 20 receives a detection signal of the wheel speed sensor 31 and detection signals of the respective input-side and output-side pressure sensors 28, 29 and respectively performs an open/close control of the first solenoid open/close valve V1 and the second and third solenoid open/close valves V2, V3.

To be more specific, the controller 20 determines whether the vehicle is in a traveling state or not upon receiving an output signal of the wheel speed sensor 31. When it is determined that the vehicle is in a traveling state, the second solenoid open/close valve V2 is turned on to open the branch passage 8.

Further, the controller 20 stores a low-pressure manipulation determination threshold value P1 and high-pressure sensor pressure-proof threshold values Ph1, Ph2, compares an input signal from the input-side pressure sensor 28 with the manipulation determination threshold value P1 and a sensor pressure-proof threshold value Ph1 and at the same time, compares an input signal from the output-side pressure sensor 29 with a sensor pressure-proof threshold value Ph2, and performs an open/close control of the first to third solenoid open/close valves V1 to V3 based on results of these comparisons.

Here, the manipulation determination threshold value P1 is a determination threshold value for determining whether the brake manipulation portion 2 is manipulated by a rider or not and is set to a fine value of approximately 0.05 MPa. Further, the sensor pressure-proof threshold value Ph1 is a determination threshold value for protecting the input-side pressure sensor 28 from a high pressure. The sensor pressure-proof threshold value Ph1 is set to an arbitrary pressure lower than a limit high pressure value which causes a malfunction of the input-side pressure sensor 28 and equal to or more than a maximum value of a manipulation pressure in a brake normally-use region. On the other hand, the sensor pressure-proof threshold value Ph2 is a determination threshold value for protecting the output-side pressure sensor 29 from a high pressure. The sensor pressure-proof threshold value Ph2 is set to an arbitrary pressure lower than a limit high pressure value which causes a malfunction of the output-side pressure sensor 29 and equal to or more than a maximum value of a manipulation pressure in a brake normally-use region.

Further, the controller 20 receives the detection signals of the respective input-side and output-side pressure sensors 28, 29, and performs a drive control of the electrically-operated motor 23 of the hydraulic modulator 6 based on these signals. Further, the controller 20 receives the respective detection signals from the wheel speed sensors 31 of the front wheel and the rear wheel, determines slip ratios of the respective wheels based on these detection signals, and performs a drive control of the electrically-operated motor 23 of the hydraulic modulator 6 while maintaining the slip ratios of the respective wheels within a proper range (ABS control).

Subsequently, the manner of operation of the brake device is explained. Here, although the liquid pressures in the respective portions of the passage are explained using specific numerical values, the numerical apertures described here merely describe one example.

System Non-operative State

When the ignition switch assumes an OFF state, the respective solenoid open/close valves V1 to V3 in the hydraulic circuit 1 are also held in an OFF state. Accordingly, as shown in FIG. 1, the normally-open first solenoid open/close valve V1 opens the main brake passage 5 and the normally-closed second and third solenoid open/close valve V2, V3 respectively close the branch passage 8 and the supply/discharge passage 7. Accordingly, when the rider performs the brake manipulation in such a state, the liquid pressure corresponding to the manipulation is supplied to the brake caliper 4 from the master cylinder 3 through the main brake passage 5. Here, the liquid pressure is supplied to the brake caliper 4 in the same manner also when an electric system of the system causes a trouble.

Here, even when the system is in a non-operative state, there may be considered a situation in which a large liquid pressure is generated in the inside of the system due to any reason such as an excessive manipulation of the brake manipulation portion 2. However, the input-side pressure sensor 28 is positioned in the inside of the branch passage 8 on the reaction simulator 9 side while sandwiching the second solenoid open/close valve V2 in a closed state between the input-side pressure sensor 28 and the master cylinder 3. Thus, there is no possibility that the high pressure in the inside of the main brake passage 5 is directly applied to the input-side pressure sensor 28. Further, the output-side pressure sensor 29 is, in the same manner, positioned in the supply/discharge passage 7 on the hydraulic modulator 6 side while sandwiching the third solenoid open/close valve V3 in a closed state between the output-side pressure sensor 29 and the brake caliper 4. Thus, there is no possibility that the high pressure in the inside of the main brake passage 5 is directly applied to the output-side pressure sensor 29.

To explain more specifically, for example, with respect to the pressure sensors 28, 29 which detect 0 to 4.9 MPa, when there exists a possibility that the following performance of the pressure sensors 28, 29 is changed when the liquid pressure of 9.8 MPa or more is applied to the pressure sensors 28, 29, it is necessary to prevent the liquid pressure of 9.8 MPa or more from being applied to the pressure sensors 28, 29. In this embodiment, when the system is in a non-operative state, both pressure sensors 28, 29 are interrupted from the main brake passage 5 by the second and third solenoid open/close valves V2, V3. Accordingly, even when the inner pressure of the main brake passage 5 is increased to 9.8 MPa or more, there is no possibility that the pressure is applied to pressure sensors 28, 29. Thus, the pressure sensors 28, 29 can be surely protected from the elevation of the inner pressure of the system.

System Operation Preparation State

Figure 2:
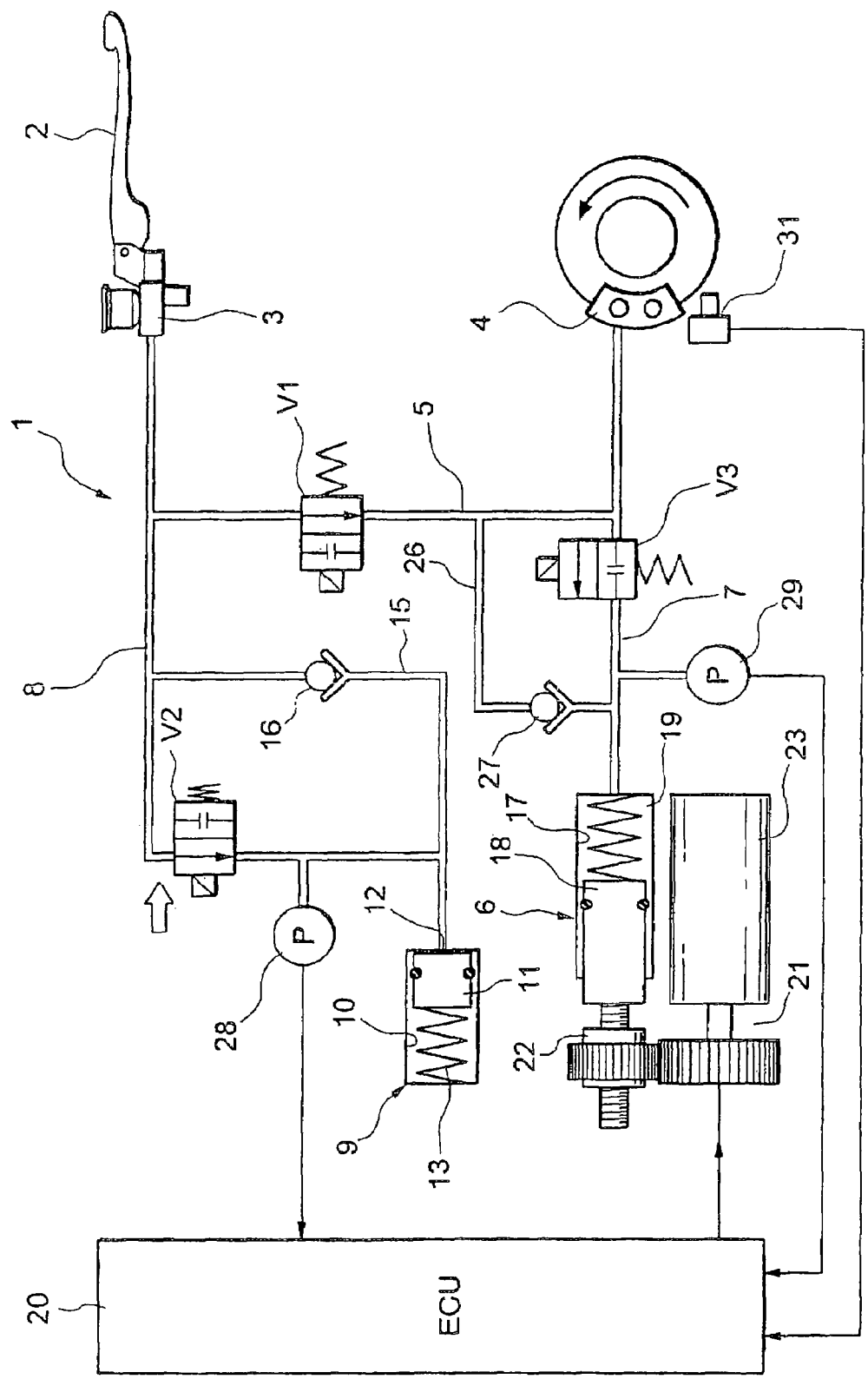
FIG. 2 illustrates a hydraulic circuit diagram showing a system operation preparation state of the brake device.

When the vehicle in a stop state starts and the starting is detected by the wheel speed sensor 31, as shown in FIG. 2, the controller 20 turns on the second solenoid open/close valve V2 to open the branch passage 8 thus making the input-side pressure sensor 28 communicated with the master cylinder 3 side. Accordingly, the input-side pressure sensor 28 can detect the liquid pressure on the master cylinder 3 side and the preparation of the brake operation by the by-wire method is completed. Here, the second solenoid open/close valve V2 may be controlled with a current smaller than a rated current thus further reducing the power consumption of the system.

For example, when the second solenoid open/close valve V2 is configured to exhibit the maximum performance at a rated current of 0.5 A, it may be sufficient to hold the second solenoid open/close valve V2 in an open state with a minimum current of approximately 0.24 A which operates a valve element.

System Operation State

Figure 3:
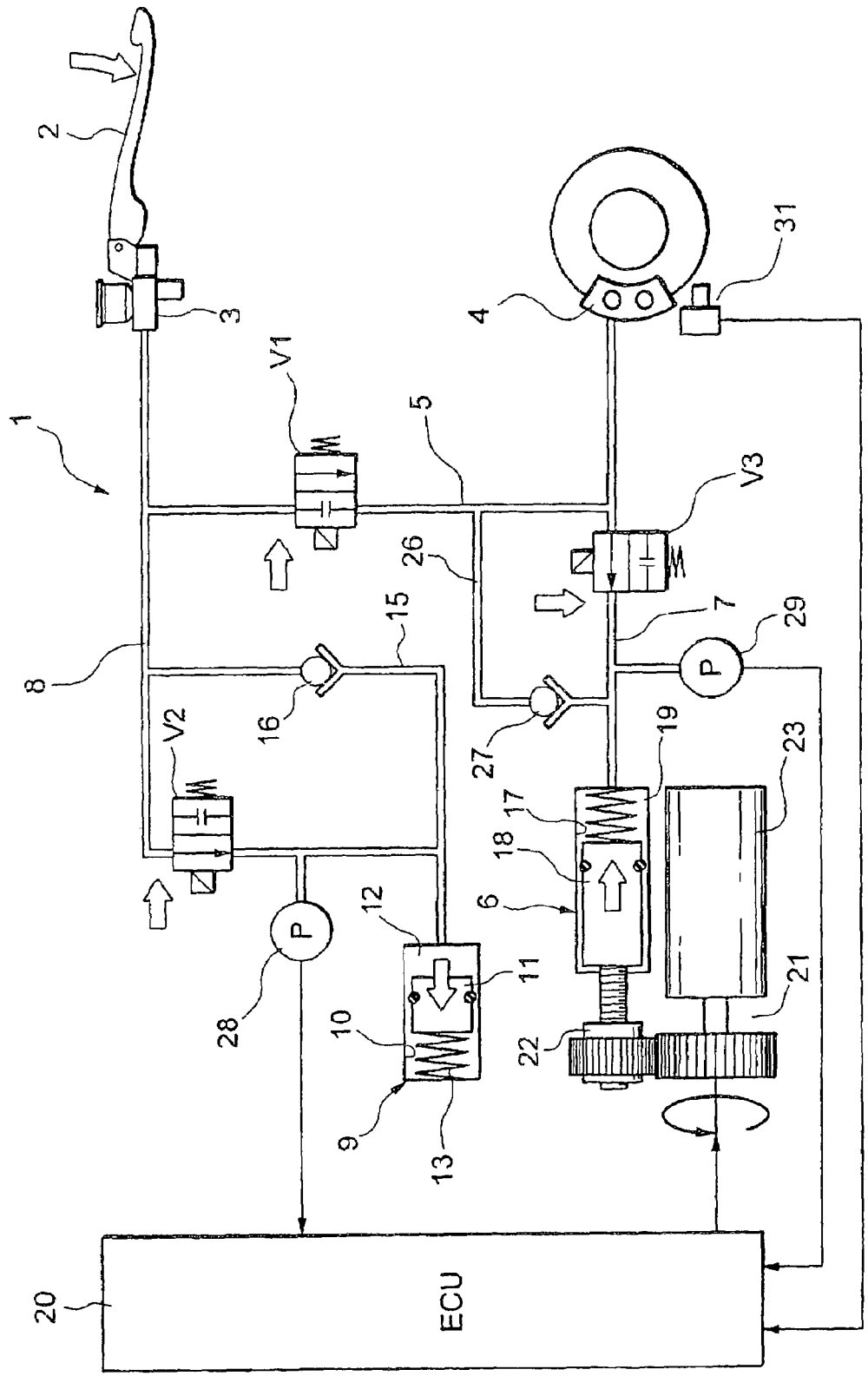
FIG. 3 illustrates a hydraulic circuit diagram showing a system operation state of the brake device.

When the rider manipulates the brake manipulation portion 2 from such a state, the elevation of the pressure in the master cylinder 3 attributed to the manipulation (the pressure equal to or more than the manipulation determination threshold value P1) is detected by the second solenoid open/close valve V2. Here, as shown in FIG. 3, the first solenoid open/close valve V1 and the third solenoid open/close valve V3 are turned on by the controller 20 and, at the same time, the hydraulic modulator 6 is controlled to generate the pressure corresponding to the detection value of the input-side pressure sensor 28. Due to such an operation, the main brake passage 5 is interrupted by the first solenoid open/close valve V1 and the liquid pressure generated by the hydraulic modulator 6 is applied to the brake caliper 4. Here, the pressure of the brake caliper 4 is detected by the output-side pressure sensor 29, and the controller 20 performs a feedback control of the hydraulic modulator 6 (electrically-operated motor 23) such that the pressure of the brake caliper 4 arrives at a target value.

On the other hand, the liquid pressure generated by the master cylinder 3 is introduced into the reaction simulator 9 through the branch passage 8 and deforms the reaction spring 13 in the inside of the reaction simulator 9. Due to such an operation, a reaction similar to a reaction which is generated when the brake caliper 4 is directly manipulated is applied to the brake manipulation portion 2 thus giving a natural brake manipulation feeling to a rider.

Here, the above-mentioned manner of operation at the time of performing the system operation is performed in the substantially same manner also with respect to the hydraulic circuit side which constitutes the slave side besides the hydraulic circuit 1 side which is manipulated by the brake manipulation portion 2 and constitutes the main side. That is, when the brake manipulation of the hydraulic circuit 1 which constitutes the main circuit is performed, in the hydraulic circuit which constitutes the slave side, the controller 20 turns on the first solenoid open/close valve V1 and the third solenoid open/close valve V3. Thus, the liquid pressure is supplied to the brake caliper 4 on the slave side from the hydraulic modulator 6 in a state that the main brake passage 5 is interrupted.

System Operation State (Protection of Input-side Pressure Sensor

Figure 4:
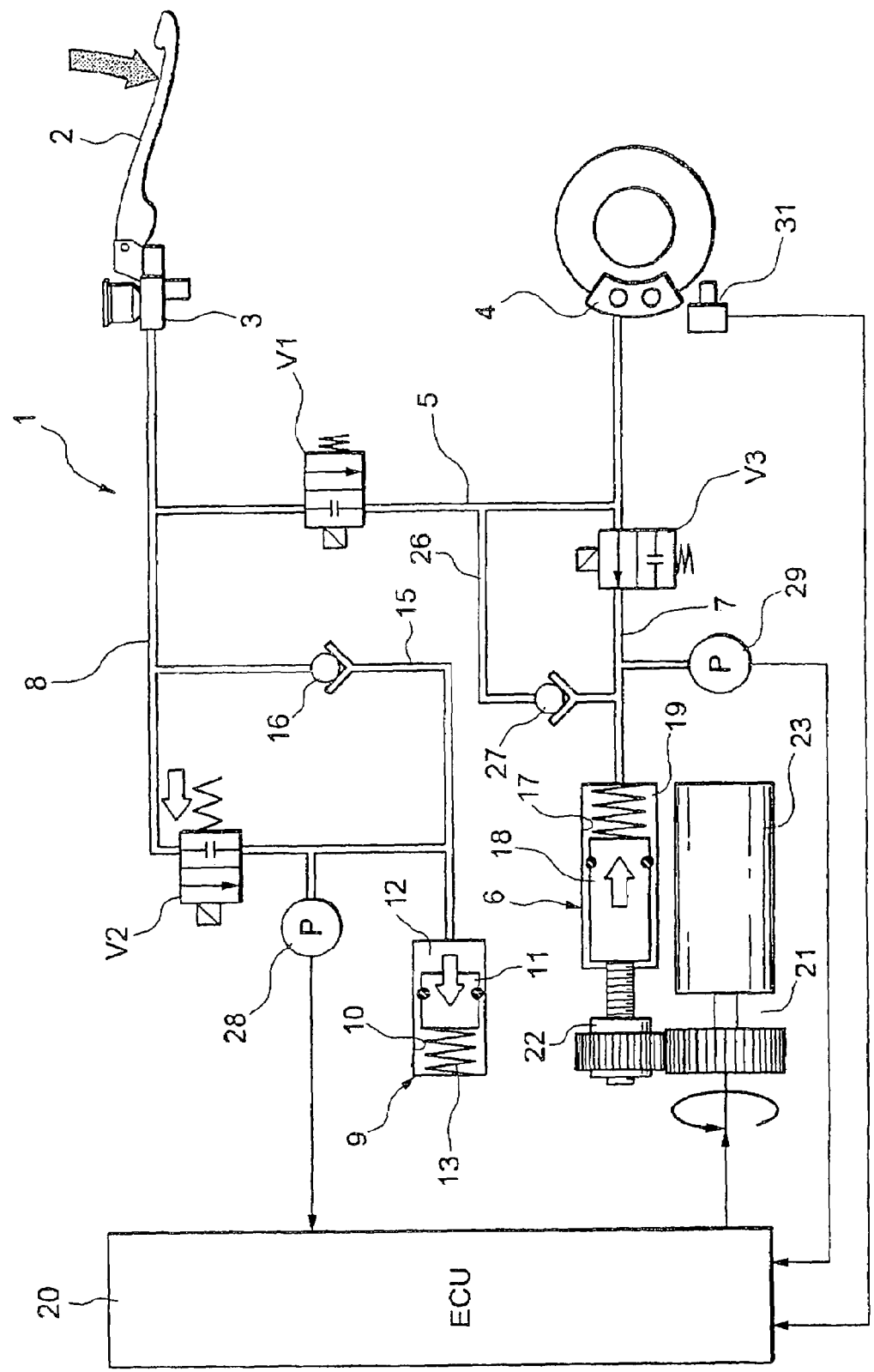
FIG. 4 illustrates a hydraulic circuit diagram at the time of performing a protective control of an input-side pressure sensor of the brake device.

Further, in the above-mentioned system operation state, when the large liquid pressure (liquid pressure equal to or more than the sensor pressure-proof threshold value Ph1) is generated on the master cylinder 3 side due to the excessive operation or the like of the brake manipulation portion 2, at a point in time that the input-side pressure sensor 28 detects the liquid pressure equal to or more than the sensor pressure-proof threshold value Ph1, as shown in FIG. 4, the controller 20 interrupts the branch passage 8 by turning off the second solenoid open/close valve V2. As a result, the input-side pressure sensor 28 is interrupted from the master cylinder 3 side so that the excessive liquid pressure on the master cylinder 3 side is not directly applied to the input-side pressure sensor 28.

For example, in the case when the input-side pressure sensor 28, which detects the above-mentioned 0 to 4.9 MPa, at a point of time that the pressure of 4.9 MPa or more is detected, the second solenoid open/close valve V2 is closed. Accordingly, even when the liquid pressure on the master cylinder 3 side is extremely increased, the liquid pressure of 9.8 MPa or more which causes a change of the sensor performance is not applied to the input-side pressure sensor 28.

System Operation State (Protection of Output-side Pressure Sensor

Figure 5:
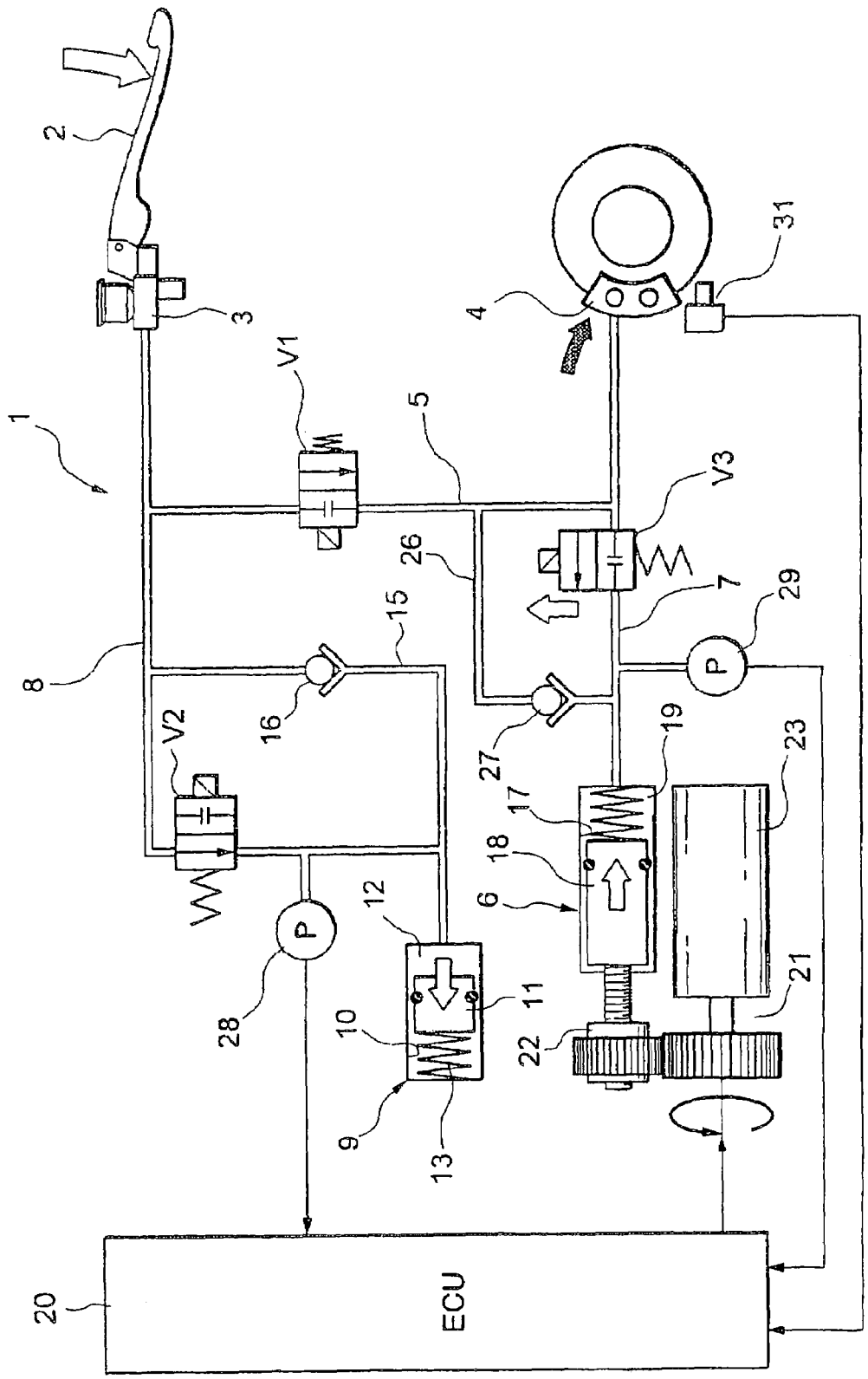
FIG. 5 illustrates a hydraulic circuit diagram at the time of performing a protective control of the input-side pressure sensor of the brake device.

Further, in the above-mentioned system operational state, when the large liquid pressure (liquid pressure equal to or more than the sensor pressure-proof threshold value Ph2) is generated on the brake caliper 4 side, at a point in time that the output-side pressure sensor 29 detects the liquid pressure equal to or more than the sensor pressure-proof threshold value Ph2, as shown in FIG. 5, the controller 20 interrupts the supply/discharge passage 7 by turning off the third solenoid open/close valve V3. Accordingly, also in this case, the third solenoid open/close valve V3 is interrupted from the brake caliper 4 side so that the excessive liquid pressure on the brake caliper 4 side is not directly applied to the output-side pressure sensor 29.

Also in this case, for example, with the use of the output-side pressure sensor 29 which detects the above-mentioned 0 to 4.9 MPa, the liquid pressure of 9.8 MPa or more which causes a change of the sensor performance is not applied to the output-side pressure sensor 29.

As described above, irrespective of the system operative time or the system non-operative time, the brake device of the present invention can surely prevent the high pressure which exceeds the sensor pressure-proof threshold values Ph1, Ph2 from being directly applied to the input-side pressure sensor 28 or the output-side pressure sensor 29. Thus, it is possible to adopt a pressure sensor of high resolution as the input-side pressure sensor 28 and the output-side pressure sensor 29 without taking the pressure proof performance into consideration. Accordingly, when the rider starts the brake manipulation from the above-mentioned system operation preparation state, the liquid pressure can be detected with high sensitivity by the input-side pressure sensor 28 from a brake manipulation start initial time whereby the system can be speedily changed over to the by-wire method. Accordingly, even after the system is changed over to the by-wire system, it is possible to perform a control of high accuracy using the input-side pressure sensor 28 and the output-side pressure sensor 29.

Here, the present invention is not limited to the above-mentioned embodiment and various modifications can be conceived without departing from the gist of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle-use brake device comprising:
a master cylinder operatively interlockingly operable with a brake manipulation portion;
wheel braking means for imparting a braking force to a wheel based on a hydraulic manipulation;
a main brake passage for connecting the master cylinder and the wheel braking means;
a normally-open first solenoid open/close valve operatively connected to the main brake passage for manipulating the communication between the master cylinder and the wheel braking means and the interruption of the communication;
a reaction simulator for applying a pseudo hydraulic reaction corresponding to a manipulated variable of the brake manipulation portion to the master cylinder;
a branch passage branched from a portion of the main brake passage at a position closer to the master cylinder than the first solenoid open/close valve for connecting the main brake passage and the reaction simulator;
a normally-closed second solenoid open/close valve which is interposed in the branch passage for manipulating the communication between the master cylinder and the reaction simulator and the interruption of the communication;
a hydraulic modulator for generating a liquid pressure by an electrically-operated actuator;
a supply/discharge passage merged to a portion of the main brake passage at a position closer to the wheel braking means than the first solenoid open/close valve and for connecting the hydraulic modulator and the wheel braking means;
a normally-closed third solenoid open/close valve interposed in the supply/discharge passage for manipulating the communication between the hydraulic modulator and the wheel braking means and the interruption of the communication;
an input-side pressure sensor for detecting an inner pressure of a passage on a side of the master cylinder;
an output-side pressure sensor for detecting an inner pressure of a passage on a side of the wheel braking means; and
control means for controlling the hydraulic modulator and the first to third solenoid open/close valves in response to an operation state of a vehicle and a brake manipulation;
wherein the input-side pressure sensor is arranged on the branch passage on a side of the reaction simulator while sandwiching the second solenoid open/close valve between the master cylinder and the input-side pressure sensor; and
wherein the output-side pressure sensor is arranged on the supply/discharge passage on a side of the hydraulic modulator while sandwiching the third solenoid open/close valve between the wheel braking means and the output-side pressure sensor.

2. The vehicle-use brake device according to claim 1, wherein the vehicle-use brake device includes traveling condition detection means for detecting a traveling condition of the vehicle, and the control means performs a control to bring the second solenoid open/close valve into an open state in response to the detection of traveling of the vehicle by the traveling state detection means.

3. The vehicle-use brake device according to claim 2, wherein when the input-side pressure sensor detects a pressure equal to or more than a manipulation determination threshold value for determining the presence or non-presence of the brake manipulation after the second solenoid open/close valve is controlled to assume an open state, the control means performs a control to bring the first solenoid open/close valve into a closed state and performs a control to bring the third solenoid open/close valve into an open state.

4. The vehicle-use brake device according to claim 2, wherein when the input-side pressure sensor detects a pressure equal to or more than a pressure-proof threshold value of the input-side pressure sensor after the second solenoid open/close valve is controlled to assumes an open state, the control means performs a control to bring the second solenoid open/close valve into a closed state.

5. The vehicle-use brake device according to claim 3, wherein when the input-side pressure sensor detects a pressure equal to or more than a pressure-proof threshold value of the input-side pressure sensor after the second solenoid open/close valve is controlled to assumes an open state, the control means performs a control to bring the second solenoid open/close valve into a closed state.

6. The vehicle-use brake device according to claim 3, wherein when the output-side pressure sensor detects a pressure equal to or more than a pressure-proof threshold value of the output-side pressure sensor after the third solenoid open/close valve is controlled to assumes an open state, the control means performs a control to bring the third solenoid open/close valve into a closed state.

7. A vehicle-use brake device comprising:
a master cylinder operatively connected to a brake manipulation portion;
wheel braking member for imparting a braking force to a wheel based on a hydraulic manipulation;
a main brake passage for connecting the master cylinder and the wheel braking member;
a normally-open first solenoid open/close valve operatively connected to the main brake passage for manipulating the communication between the master cylinder and the wheel braking member and the interruption of the communication;
a reaction simulator for applying a pseudo hydraulic reaction corresponding to a manipulated variable of the brake manipulation portion to the master cylinder;
a branch passage branched from a portion of the main brake passage at a position closer to the master cylinder than the first solenoid open/close valve for connecting the main brake passage and the reaction simulator;
a normally-closed second solenoid open/close valve interposed in the branch passage for manipulating the communication between the master cylinder and the reaction simulator and the interruption of the communication;
a hydraulic modulator for generating a liquid pressure by an electrically-operated actuator;
a supply/discharge passage merged to a portion of the main brake passage at a position closer to the wheel braking member than the first solenoid open/close valve and for connecting the hydraulic modulator and the wheel braking member;
a normally-closed third solenoid open/close valve interposed in the supply/discharge passage for manipulating the communication between the hydraulic modulator and the wheel braking member and the interruption of the communication;
an input-side pressure sensor for detecting an inner pressure of a passage on a side of the master cylinder;
an output-side pressure sensor for detecting an inner pressure of a passage on a side of the wheel braking member; and
a control member for controlling the hydraulic modulator and the first to third solenoid open/close valves in response to an operation state of a vehicle and a brake manipulation;
wherein the input-side pressure sensor is arranged on the branch passage on a side of the reaction simulator while sandwiching the second solenoid open/close valve between the master cylinder and the input-side pressure sensor; and wherein the output-side pressure sensor is arranged on the supply/discharge passage on a side of the hydraulic modulator while sandwiching the third solenoid open/close valve between the wheel braking means and the output-side pressure sensor.

8. The vehicle-use brake device according to claim 7, wherein the vehicle-use brake device includes traveling a condition detection member for detecting a traveling condition of the vehicle, and the control member performs a control to bring the second solenoid open/close valve into an open state in response to the detection of traveling of the vehicle by the traveling state detection member.

9. The vehicle-use brake device according to claim 8, wherein when the input-side pressure sensor detects a pressure equal to or more than a manipulation determination threshold value for determining the presence or non-presence of the brake manipulation after the second solenoid open/close valve is controlled to assume an open state, the control member performs a control to bring the first solenoid open/close valve into a closed state and performs a control to bring the third solenoid open/close valve into an open state.

10. The vehicle-use brake device according to claim 8, wherein when the input-side pressure sensor detects a pressure equal to or more than a pressure-proof threshold value of the input-side pressure sensor after the second solenoid open/close valve is controlled to assumes an open state, the control member performs a control to bring the second solenoid open/close valve into a closed state.

11. The vehicle-use brake device according to claim 9, wherein when the input-side pressure sensor detects a pressure equal to or more than a pressure-proof threshold value of the input-side pressure sensor after the second solenoid open/close valve is controlled to assumes an open state, the control member performs a control to bring the second solenoid open/close valve into a closed state.

12. The vehicle-use brake device according to claim 9, wherein when the output-side pressure sensor detects a pressure equal to or more than a pressure-proof threshold value of the output-side pressure sensor after the third solenoid open/close valve is controlled to assumes an open state, the control member performs a control to bring the third solenoid open/close valve into a closed state.

13. A vehicle-use brake device comprising:
a master cylinder operatively connected to a brake manipulation portion;
a wheel brake for imparting a braking force to a wheel based on a hydraulic manipulation;
a main brake passage for connecting the master cylinder and the wheel brake;
a first solenoid open/close valve operatively connected to the main brake passage for manipulating the communication between the master cylinder and the wheel brake and the interruption of the communication;
a reaction simulator for applying a pseudo hydraulic reaction corresponding to a manipulated variable of the brake manipulation portion to the master cylinder;
a branch passage branched from a portion of the main brake passage at a position closer to the master cylinder than the first solenoid open/close valve for connecting the main brake passage and the reaction simulator;
a normally-closed second solenoid open/close valve interposed in the branch passage for manipulating the communication between the master cylinder and the reaction simulator and the interruption of the communication;
a hydraulic modulator for generating a liquid pressure by an electrically-operated actuator;

a supply/discharge passage merged to a portion of the main brake passage at a position closer to the wheel brake than the first solenoid open/close valve and for connecting the hydraulic modulator and the wheel brake;

a normally-closed third solenoid open/close valve interposed in the supply/discharge passage for manipulating the communication between the hydraulic modulator and the wheel brake and the interruption of the communication;

an input-side pressure sensor for detecting an inner pressure of a passage on a side of the master cylinder;

an output-side pressure sensor for detecting an inner pressure of a passage on a side of the wheel brake; and a controller for controlling the hydraulic modulator and the first to third solenoid open/close valves in response to an operation state of a vehicle and a brake manipulation;

wherein the input-side pressure sensor is arranged on the branch passage on a side of the reaction simulator while sandwiching the second solenoid open/close valve between the master cylinder and the input-side pressure sensor; and wherein the output-side pressure sensor is arranged on the supply/discharge passage on a side of the hydraulic modulator while sandwiching the third solenoid open/close valve between the wheel brake and the output-side pressure sensor.

14. The vehicle-use brake device according to claim 13, wherein the vehicle-use brake device includes traveling condition detection means for detecting a traveling condition of the vehicle, and the controller performs a control to bring the second solenoid open/close valve into an open state in response to the detection of traveling of the vehicle by the traveling state detection means.

15. The vehicle-use brake device according to claim 14, wherein when the input-side pressure sensor detects a pressure equal to or more than a manipulation determination threshold value for determining the presence or non-presence of the brake manipulation after the second solenoid open/close valve is controlled to assume an open state, the controller performs a control to bring the first solenoid open/close valve into a closed state and performs a control to bring the third solenoid open/close valve into an open state.

16. The vehicle-use brake device according to claim 14, wherein when the input-side pressure sensor detects a pressure equal to or more than a pressure-proof threshold value of the input-side pressure sensor after the second solenoid open/close valve is controlled to assumes an open state, the controller performs a control to bring the second solenoid open/close valve into a closed state.

17. The vehicle-use brake device according to claim 15, wherein when the input-side pressure sensor detects a pressure equal to or more than a pressure-proof threshold value of the input-side pressure sensor after the second solenoid open/close valve is controlled to assumes an open state, the controller performs a control to bring the second solenoid open/close valve into a closed state.

18. The vehicle-use brake device according to claim 15, wherein when the output-side pressure sensor detects a pressure equal to or more than a pressure-proof threshold value of the output-side pressure sensor after the third solenoid open/close valve is controlled to assumes an open state, the controller performs a control to bring the third solenoid open/close valve into a closed state.

* * * * *